(12) United States Patent
Maiville et al.

(10) Patent No.: US 11,105,451 B2
(45) Date of Patent: Aug. 31, 2021

(54) HEAT TRANSFER INTERRUPTION FOR IMPROVED FIRE RESISTANCE/PROOF PERFORMANCE

(71) Applicant: Eaton Intelligent Power Limited, Dublin (IE)

(72) Inventors: Randolph L. Maiville, Onondaga, MI (US); William T. Flynn, Horton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 253 days.

(21) Appl. No.: 16/008,396

(22) Filed: Jun. 14, 2018

(65) Prior Publication Data
US 2019/0011068 A1    Jan. 10, 2019

Related U.S. Application Data

(60) Provisional application No. 62/529,676, filed on Jul. 7, 2017.

(51) Int. Cl.
| | | |
|---|---|---|
| *F16J 15/02* | (2006.01) | |
| *F16L 37/084* | (2006.01) | |
| *F16L 21/02* | (2006.01) | |
| *F16L 19/07* | (2006.01) | |
| *F16L 19/00* | (2006.01) | |
| *F16J 15/3276* | (2016.01) | |

(52) U.S. Cl.
CPC ......... *F16L 37/0845* (2013.01); *F16J 15/022* (2013.01); *F16L 19/005* (2013.01); *F16L 19/07* (2013.01); *F16L 21/022* (2013.01); *F16J 15/3276* (2013.01)

(58) Field of Classification Search
CPC ..... F16L 37/0845; F16L 19/005; F16L 19/07; F16L 21/022; F16J 15/022; F16J 15/3276
See application file for complete search history.

(56) References Cited

U.S. PATENT DOCUMENTS

| | | |
|---|---|---|
| 4,034,959 A | 7/1977 | Morrison |
| 4,588,424 A | 5/1986 | Heath et al. |
| 4,676,806 A | 6/1987 | Dean et al. |
| 5,246,236 A * | 9/1993 | Szarka ................... E21B 34/06 277/337 |

(Continued)

FOREIGN PATENT DOCUMENTS

| | | |
|---|---|---|
| WO | 2014005381 A1 | 1/2014 |
| WO | 2014194556 A1 | 12/2014 |

*Primary Examiner* — Gilbert Y Lee
(74) *Attorney, Agent, or Firm* — Fishman Stewart PLLC

(57) ABSTRACT

A fluid coupling includes a first adapter having at least one seal groove in an inner diameter surface of the first adapter, and at least one interruption in the inner diameter surface adjacent to the at least one seal groove. The fluid coupling may include a second adapter having an outer diameter surface engaging with at least a portion of the inner diameter surface of the first adapter to form a conductor path between the first adapter and the second adapter. The fluid coupling may further include at least one seal disposed in the at least one seal groove to provide a sealed connection between the first adapter and the second adapter. The at least one interruption may be configured to interrupt the conductor path in a region around the at least one seal.

20 Claims, 3 Drawing Sheets

(56) References Cited

U.S. PATENT DOCUMENTS

| | | | | |
|---|---|---|---|---|
| 5,257,792 A | * | 11/1993 | Putch | E21B 33/03 |
| | | | | 166/387 |
| 5,996,695 A | * | 12/1999 | Koleilat | E21B 33/03 |
| | | | | 166/382 |
| 9,989,157 B2 | * | 6/2018 | Hunter | F16K 39/04 |
| 2006/0220327 A1 | | 10/2006 | Russell | |
| 2013/0187338 A1 | * | 7/2013 | Dommati | E21B 33/04 |
| | | | | 277/343 |

* cited by examiner

HEAT TRANSFER INTERRUPTION FOR IMPROVED FIRE RESISTANCE/PROOF PERFORMANCE

CROSS-REFERENCE TO RELATED APPLICATIONS

This application claims the benefit of U.S. Provisional Patent Application Ser. No. 62/529,676, filed on Jul. 7, 2017, the disclosure of which is hereby incorporated herein by reference in its entirety.

TECHNICAL FIELD

The present disclosure relates to fluid couplings, including fluid couplings with heat transfer interruption that can provide improved fire resistance and/or fire proof performance.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Fluid couplings are commonly used in a number of industries for connecting sections of hoses with fittings to permit the flow of fluid therethrough. Many industries, including the aerospace industry, may require fluid couplings to have certain fire protection ratings. For example, some standards may require the fluid couplings to be fire resistant for five minutes, and some may require the couplings to be fireproof for fifteen minutes. Therefore, it may be desirable to design and provide, inter alia, a fluid coupling that is fire resistant and/or fireproof (per industry standards). Fluid couplings may employ elastomeric seals to seal potential leak paths. However, during a fire, elastomeric seals may heat up (due to conduction of heat from surrounding elements) and may no longer function as intended or desired.

Consequently, there can be a desire for solutions/options that minimize, eliminate, or otherwise address one or more of the aforementioned challenges. The foregoing discussion is intended only to illustrate examples associated with the present field and should not be considered any form of disavowal of scope.

SUMMARY

In embodiments, an exemplary fluid coupling may include a first adapter having at least one seal groove in an inner diameter surface of the first adapter, and at least one interruption in the inner diameter surface adjacent to the at least one seal groove. The fluid coupling may also include a second adapter having an outer diameter surface engaging with at least a portion of the inner diameter surface of the first adapter to form a conductor path between the first adapter and the second adapter. The fluid coupling may further include at least one seal disposed in the at least one seal groove to provide a sealed connection between the first adapter and the second adapter. The at least one interruption may be configured to interrupt the conductor path in a region around the at least one seal.

In other embodiments, an exemplary adapter assembly for a fluid coupling may include a housing body having an inner diameter surface. The adapter assembly may also have at least one seal groove in the inner diameter surface configured to receive a seal. The adapter assembly may further include at least one interruption in the inner diameter surface adjacent to the at least one seal. The at least one interruption may be configured to interrupt a conductor path formed between the housing body and another body engaged with at least a portion of the inner diameter surface.

The foregoing and other aspects, features, details, utilities, and advantages of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents.

Figure 1:
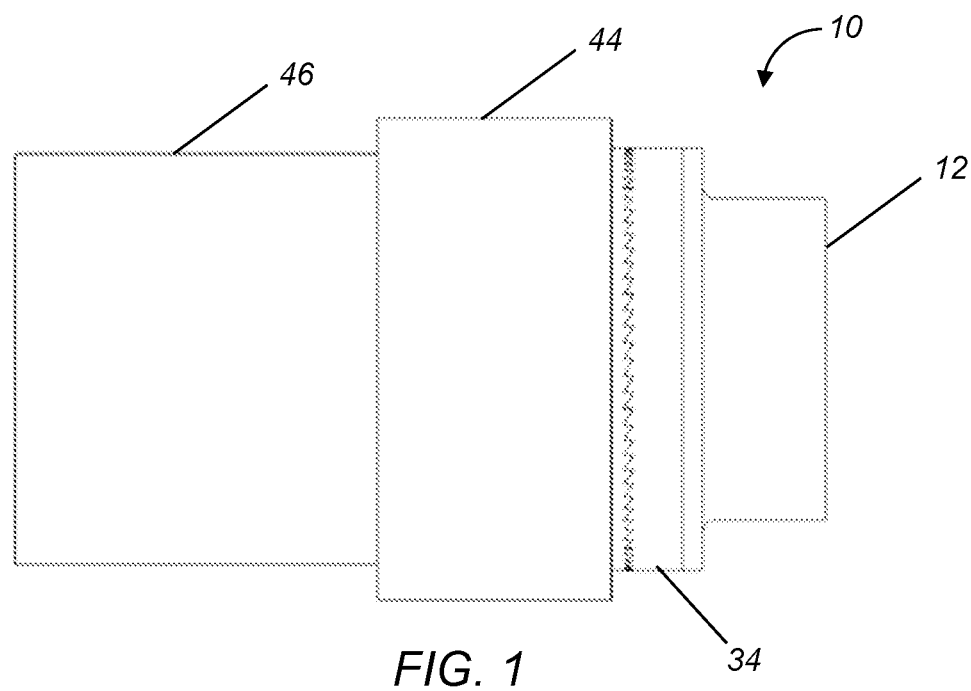
FIG. 1 is a side view of an embodiment of a fluid coupling embodying aspects or teachings of the present disclosure.
Figure 2:
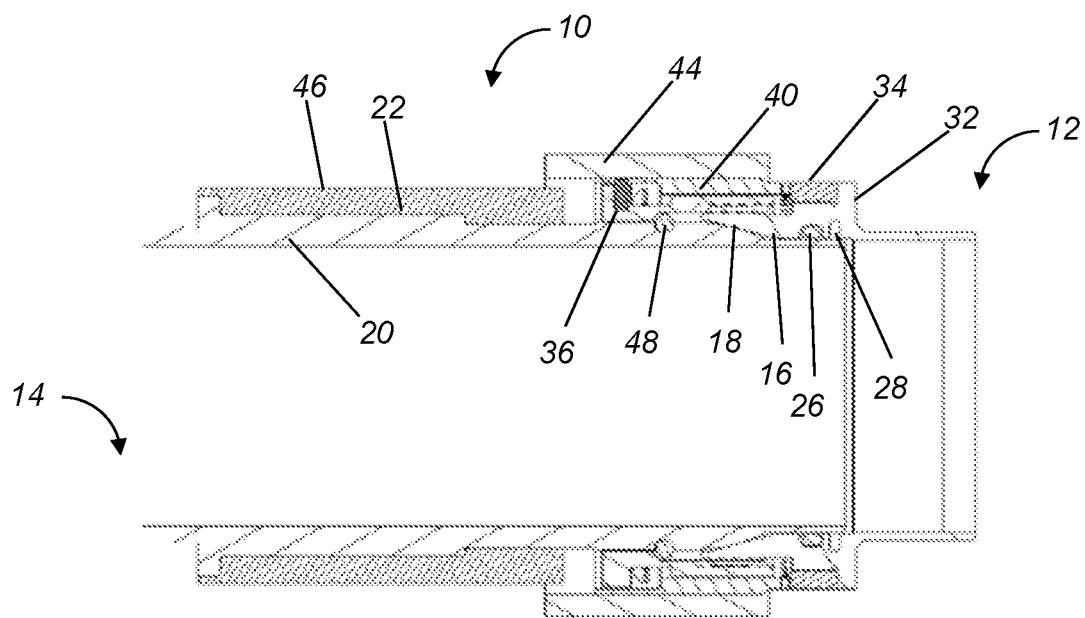
FIG. 2 is a cross-sectional view of the fluid coupling of FIG. 1.
Figure 3:
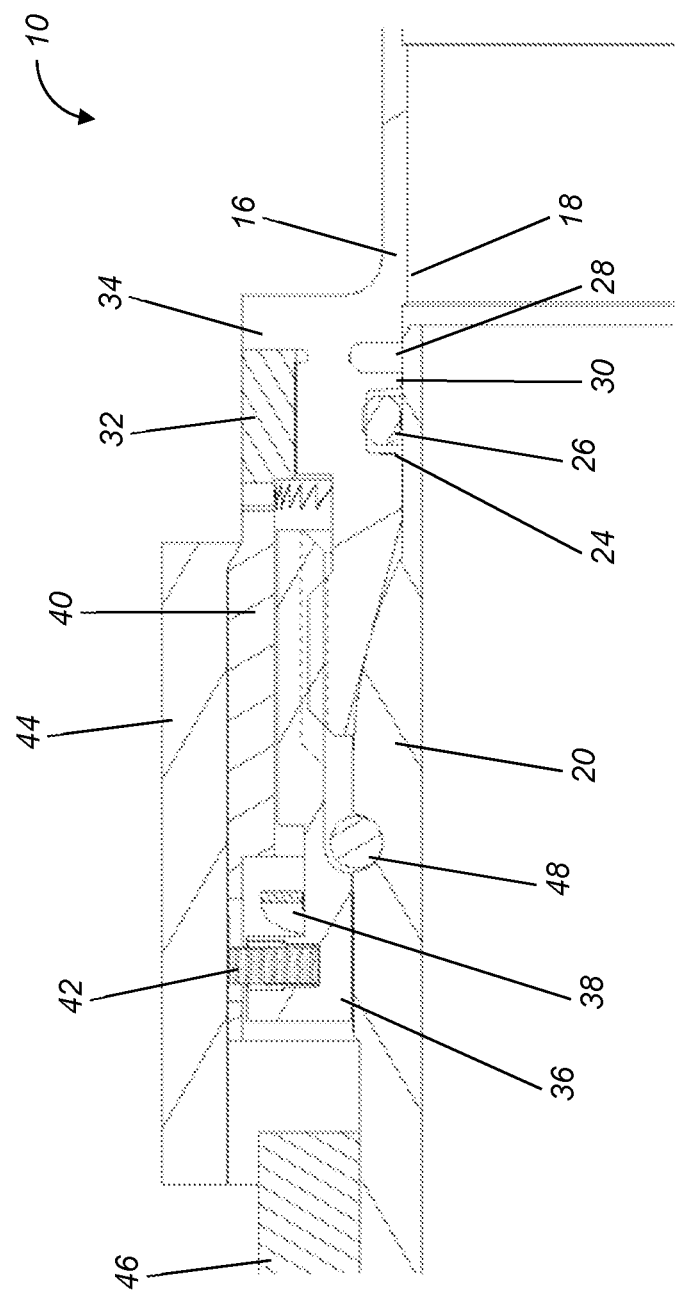
FIG. 3 is a partial, enlarged cross-sectional view of the fluid coupling of FIG. 1.

As generally illustrated in FIGS. 1-3, embodiments of a fluid coupling 10 generally may include a first adapter or adapter assembly 12 engaging with a second adapter or adapter assembly 14. The second adapter 14 may include, for example and without limitation, a tube, a pipe, a connecting assembly, and the like. The first adapter 12 and the second adapter 14 generally may be made or comprised of a metal and they may form a conductor path between the first and second adaptors when engaged with each other. In an embodiment, the second adapter 14 may be insertable and/or disposed within an interior of the first adapter 12. As generally illustrated in FIGS. 2 and 3, the first adapter 12 may have a housing body 16 with an inner diameter surface 18, and the second adapter 14 may have a body 20 having an outer diameter surface 22. The housing body 16 and the body 20 may be generally cylindrical in shape, though it should be appreciated that they may have various geometric configurations and/or varying dimensions. For example and without limitation, the housing body 16 and/or the body 20 may each have different inner diameters and/or outer diameters at different axial locations.

The first adapter 12 may include a seal groove 24 in an inner diameter surface 18 and a seal 26 may be disposed at least partially in the seal groove 24. The seal 26 may generally provide a sealed connection between the first adapter 12 and the second adapter 14—for example, to prevent or limit leakage of fluid flowing through the fluid coupling 10. The seal 26 may comprise, for example and without limitation, an O-ring. Although the figures primarily illustrate a fluid coupling with one seal 26 and a first adapter 12 having one corresponding seal groove 24, it will be appreciated by those of skill in the art that there may be any number of corresponding seals 26 and seal grooves 24.

A first adapter 12 may have at least one interruption 28 in the inner diameter surface 18. The interruption 28 may include, for example and without limitation, a groove extending (e.g., circumferentially) around the inner diameter surface 18. In embodiments, the interruption 28 may be located adjacent to the seal groove 24 and may include a web 30 disposed therebetween. In an embodiment, the interruption 28 may be located immediately adjacent to the seal groove 24, for example, where the web 30 may have a thickness smaller than a width of the seal groove 24 and/or the interruption 28. While the figures illustrate an embodiment of an interruption 28, it will be appreciated by those of skill in the art that there may be any number of interruptions 28 that may or may not correspond to the number of seal grooves 24, and may be at different axial locations along the housing body 20. For example, the first adapter 12 may include two interruptions 28, one on each axial side of a single seal groove 24. The interruptions 28 may or may not have the same depth and/or width. It should also be appreciated that at each axial location, the interruption 28 may extend completely or partially around the inner diameter surface 18 in a circumferential direction. It should further be appreciated that at each axial location, there may be multiple partial interruptions 28 in the circumferential direction that may or may not be the same width, depth, and/or circumferential length.

An interruption 28 generally may serve to improve fire resistance and/or fire proof performance of the fluid coupling 10. The interruption 28 may, among other things, interrupt the conductive path (e.g., a thermally conductive path) between the first adapter 12 and the second adapter 14. This conductive path may generate/conduct substantial heat that may affect the adjacent seal 26. Thus, the interruption 28 being adjacent to the seal groove 24 and the seal 26 may help to alleviate substantial heat, thereby extending the life and/or performance of the seal 26. The interruption 28 may also enable fluid, for example, a cooling fluid, to flow therethrough, and to carry heat away under certain flow conditions. Under certain pressures, the fluid may boil, thereby aiding in carrying the heat away, A first adapter 12 may include a flange portion 34 extending at least partially around the housing body 16, and a sleeve 40 disposed around at least a portion of the housing body 16 and engaging with an axial surface of the flange portion 34. The sleeve 40 may comprise, for example and without limitation, a ratchet ring 32.

In embodiments, a fluid coupling 10 may include a nut 36 disposed around at least a portion of the second adapter 14. The nut 36 may be movable in the axial direction between a first position and a second position. An end of the housing body 16 of the first adapter 12 may act as an axial stop for the axial movement of the nut 36. The fluid coupling 10 may also include a spring 38 configured to bias the nut 36 in or towards one of the first position and second position. The spring 38 may comprise, for example and without limitation, a wave washer, a disc spring, or similar components. The fluid coupling 10 may also include a sleeve 40 disposed around at least a portion of the nut 36. The sleeve 40 may be configured to constrain or control rotational movement of the nut 36 around the second adapter 14. For example and without limitation, the sleeve 40 may be configured as and/or include a ratchet.

In embodiments, a fluid coupling 10 may include a pin 42 engaged with and disposed at least partially around a nut 36, sleeves 44 and 46, and a ring 48 disposed within a groove or indentation in the outer diameter surface 22 of the body 20 of the second adapter 14 and/or in the nut 36. The sleeves 44 and/or 46 may serve as insulators for heat purposes, and may be made of or include an insulating material. For example, the sleeves may comprise, without limitation, silicone. The sleeve 44 may also be configured to secure the pin 42 against the nut 36 in a radial direction. The ring 48 may comprise, for example and without limitation, a wire.

Figure 4:
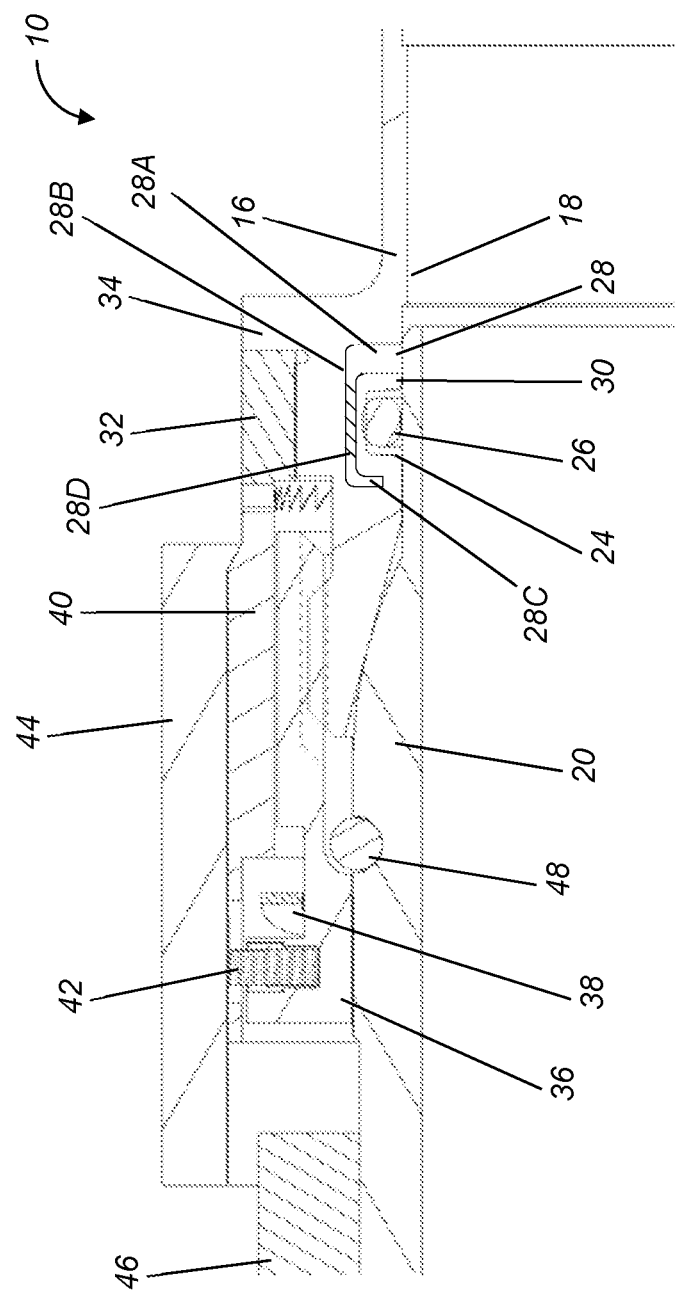
FIG. 4 is a partial, enlarged cross-sectional view of an embodiment of a fluid coupling.

With embodiments, such as generally illustrated in FIGS. 3 and 4, an interruption 28 may include one or more of a variety of shapes, sizes, and/or configurations. As generally illustrated in FIG. 3, an interruption 28 may include a generally rectangular configuration that may include rounded corners. As generally illustrated in FIG. 4, an interruption may include a U-shaped and/or J-shaped configuration that may extend, at least to some degree, around a seal groove 24. For example and without limitation, a first portion 28A of an interruption 28 may be disposed at a first side (e.g., a first axial side) of a seal groove 24, a second portion 28B of the interruption 28 may extend (e.g., in an axial direction) from the first portion 28A and radially outside of the seal groove 24, and/or a third portion 28C of the interruption 28 may extend (e.g., in a radial direction) from the second portion 28B at a second side (e.g., a second axial side) of the seal groove. The first portion 28A may extend to the inner diameter surface 18 and/or the third portion 28C may not extend to the inner diameter surface 18. In embodiments, portions of an interruption 28 may be disposed at both axial sides of a seal groove 24 (e.g., the first portion 28A and the third portion 28C). Such configurations of an interruption 28 may facilitate removal and/or dissipation of heat from a plurality of sides of a seal groove 24 and/or a seal 26.

In embodiments, such as generally illustrated in FIG. 4, an interruption 28 may include one or more internal webs 28D that may provide structural support. The internal webs 28D may, for example and without limitation, be disposed in the second portion 28B.

In some figures, portions of certain elements or features of an embodiment may not be shown and/or may be hidden to more readily illustrate other elements or features.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A fluid coupling comprising:
   a first adapter having at least one seal groove in an inner diameter surface of the first adapter, and at least one interruption in the inner diameter surface axially spaced and adjacent to the at least one seal groove;
   a second adapter having an outer diameter surface engaging with at least a portion of the inner diameter surface of the first adapter to form a conductor path between the first adapter and the second adapter; and
   at least one seal disposed in the at least one seal groove to provide a sealed connection between the first adapter and the second adapter;
   wherein the at least one interruption extends radially between the first adapter and the second adapter and is configured to interrupt the conductor path in a region around the at least one seal.

2. The fluid coupling of claim 1, wherein the at least one interruption is in the form of a groove extending at least partially around the inner diameter surface of the first adapter in a circumferential direction.

3. The fluid coupling of claim 1, wherein the first adapter includes a web disposed between the at least one seal groove and the at least one interruption.

4. The fluid coupling of claim 3, wherein the web has a thickness in an axial direction that is smaller than a width of at least one of the at least one seal groove and the at least one interruption.

5. The fluid coupling of claim 1, wherein at least one seal comprises an O-ring.

6. The fluid coupling of claim 1, including a nut disposed around at least a portion of the second adapter, the nut being movable in an axial direction between a first position and a second position.

7. The fluid coupling of claim 6, including a spring configured to bias the nut in one of the first position and the second position.

8. The fluid coupling of claim 7, wherein the spring comprises a wave washer.

9. The fluid coupling of claim 6, including at least one sleeve disposed around at least a portion of the nut.

10. The fluid coupling of claim 9, wherein the at least one sleeve comprises a ratchet.

11. The fluid coupling of claim 6, including a pin disposed around at least a portion of the nut.

12. The fluid coupling of claim 11, further comprising a sleeve configured to secure the pin against the nut in a radial direction.

13. The fluid coupling of claim 12, wherein the sleeve is comprised of silicone.

14. The fluid coupling of claim 1, wherein the first adapter includes a flange portion extending at least partially around an outer diameter surface of the first adapter, and a sleeve engaging with an axial surface of the flange portion.

15. The fluid coupling of claim 1, wherein the interruption includes a J-shaped configuration.

16. An adapter assembly for a fluid coupling, comprising:
    a housing body having an inner diameter surface;
    at least one seal groove in the inner diameter surface, the at least one seal groove configured to receive a seal; and
    at least one interruption extending radially in the inner diameter surface axially spaced and adjacent to the at least one seal groove, the at least one interruption configured to interrupt a conductor path formed between the housing body and another body engaged with at least a portion of the inner diameter surface.

17. The adapter assembly of claim 16, wherein the at least one interruption comprises a groove extending at least partially around the inner diameter surface in a circumferential direction.

18. The adapter assembly coupling of claim 16, including a web between the at least one seal groove and the at least one interruption.

19. The adapter assembly of claim 18, wherein the web has a thickness in an axial direction that is smaller than a width of at least one of the at least one seal groove and the at least one interruption.

20. The adapter assembly of claim 16, including a flange portion extending at least partially around the housing body, and a sleeve engaging with an axial surface of the flange portion.

* * * * *